United States Patent
Zinsmeyer et al.

[11] Patent Number: 5,926,441
[45] Date of Patent: Jul. 20, 1999

[54] SUN SYNCHRONIZED TIMER FOR AN ANIMAL FEEDER

[75] Inventors: Herbert G. Zinsmeyer; Donald E. Carroll, both of Austin, Tex.

[73] Assignee: Specialty Systems, Inc., Austin, Tex.

[21] Appl. No.: 09/076,477

[22] Filed: May 12, 1998

[51] Int. Cl.[6] ............................. G64B 47/00; G64B 19/24; B67D 5/08
[52] U.S. Cl. ............................. 368/10; 368/28; 368/107; 222/368; 222/650
[58] Field of Search ............................. 368/10, 107–109; 119/51.11, 51.12, 56.1, 56.2, 57.7; 222/242, 370, 638–650; 307/140, 141; 340/309.11, 309.4

[56] References Cited

U.S. PATENT DOCUMENTS

| | | | |
|---|---|---|---|
| 4,669,891 | 6/1987 | Rosevear | 368/21 |
| 4,857,759 | 8/1989 | Murphy et al. | 307/141 |
| 4,981,107 | 1/1991 | Beaudoin | 119/56.2 |
| 5,046,455 | 9/1991 | Christiansen et al. | 119/56.2 |
| 5,143,289 | 9/1992 | Gresham | 239/7 |
| 5,160,068 | 11/1992 | Fishman et al. | 222/352 |
| 5,160,853 | 11/1992 | Simon et al. | 307/140 |

*Primary Examiner*—Vit Miska
*Attorney, Agent, or Firm*—Joseph F. Long

[57] ABSTRACT

A Microprocessor controlled timer particularly adapted for control of an animal feeder with a display of program items and with user settable feeding times and duration of such feeding times based upon the microprocessor calculated sunrise and sunset times with a selector switch and a change switch and display of program items allowing user reprogramming of the timer; the timer being broadly usable for activation of electrical equipment when desirable activation is at times relative to sunrise and sunset and also being usable for activation of electrical equipment according to normal clock time.

7 Claims, 2 Drawing Sheets

SUN SYNCHRONIZED TIMER FOR AN ANIMAL FEEDER

BACKGROUND

There are large variety of timers for various purposes on the market to-day. Almost invariably these timers are set for a particular time or time period in a day based on a clock setting. This invention is aimed at filling a need for a timer that may be set to activate an output switch at user desired times and to keep the switch active for user desired periods of time. There are uses such as activation of an animal feeder wherein the most desirable time or times for activation of the feeder would be times as measured by minutes or hours before and after sunrise and times before sunset and after sunset. This invention uses inputs to a microprocessor to calculate times of sunset and sunrise from latitude, longitude, time zone, and day of the month and year, and allows a user to set activation times both by clock time and by time as measured as an offset from sunrise or sunset. The microprocessor is preprogrammed to display a menu of usual settings one line at a time for all these variables and using a single pole double throw selector switch a user may select a variable to be changed and using a second single pole double throw change switch change the settings of the variables. Output times and time periods will thereafter correspond with the new settings.

For use with an animal feeder the time periods are generally chosen between 0 and 99 seconds but periods of up to 24 hours are within the purview of the invention.

With the data as outlined the programming of the microprocessor converts automatically to and from daylight saving time and corrects for leap year. Quite generally desired activation periods are on a particular day of the week and correction for leap year allows this even with unattended operation.

SUMMARY OF THE INVENTION

The heart of the invention is a microprocessor controlled timer. The microprocessor is programmed to have a daily calendar and an internal clock. The microprocessor is further programmed to show user input settings of listed menu items one line at a time and to allow modifying each of the listed menu items with a single pole double throw selector switch to select menu items and a second single pole double throw change switch to change or modify settings of the menu items when change is desired. The microprocessor using the settings calculates and records time of sunrise and sunset and may calculate desired time activation periods in the AM as offsets from sunrise and time activation periods in the PM as offsets from sunset.

Such programming is easily done by one of normal skill in the art.

Menu items comprise latitude longitude local time zone day of the week date . . . month, day, and year time of day . . . hour, minute and seconds In a first output time settable system based upon time offsets from sunrise and sunset menu items additionally include one or more clock times in the AM and one or more clock times in the PM for closure of a minimum of one outlet or output switch with each of the closure durations being user settable to be closed for a user desired period of time. A user may choose a zero time setting and there would be no activation of the output switch.

In a second-output time settable system based upon actual clock times menu items additionally include one or more clock times per day for closure of a minimum of one output switch with each of the closure times being user settable to be closed for a user desired period of time. With a zero setting there would be no activation of the output switch.

Additionally included in the microprocessor programming may be a third output time settable system, that may be manually or remotely activated to operate the output switch.

The display on the timer face is activated by an upward or downward push of the selector switch and remains activated for a limited preprogrammed period usually about two minutes after the last use of the selector switch in order to minimize battery drain. The first line of the display always shows sunrise and sunset times after the initial default settings or required menu entries which include longitude and latitude are made. The second line of the display shows the menu one line at a time as called up sequentially with the selector switch.

There will be one or more output switches with each of the output switches controlled by preselected and programmed menu lines or settings and the microprocessor based clock. The output switches may lead to any of a wide variety of electrically operated devices.

When the timer is used in a dispensing unit attached to an animal feeder the output switch activates an electric motor to operate the dispensing unit. The timer operates on DC power from a battery or rectified AC power.

An operator controlled remote control unit may be included with the animal feeder to allow an operator to activate the dispensing unit at will without interfering with preset times of operation.

DESCRIPTION OF THE INVENTION

Figure 1:
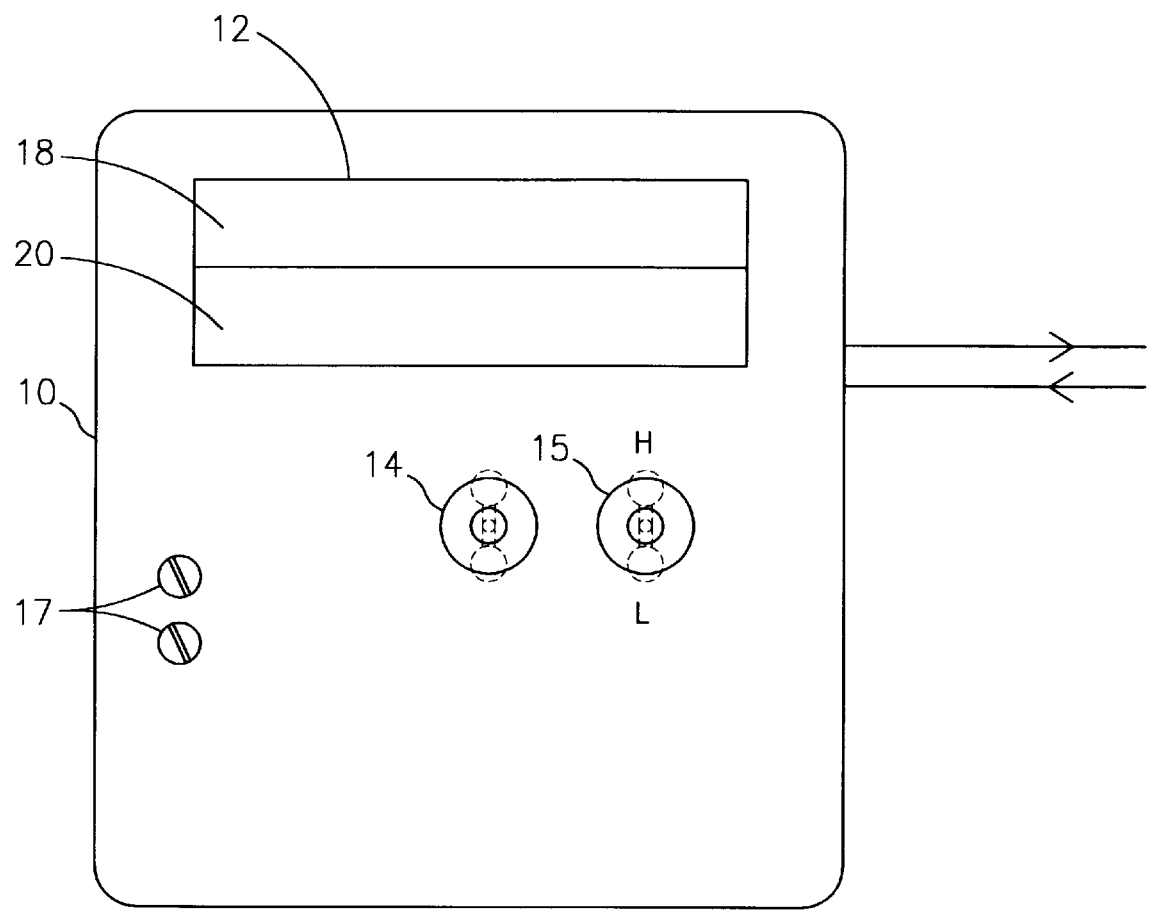
FIG. 1 shows the sun synchronized timer.

The invention may best be described from the drawings. In FIG. 1 a timer face 10 with a two line electronic display screen 12 as shown. A microprocessor controller 30, FIG. 2 is programmed with menu item default settings that using a single pole double throw selector switch 14 may be called up to appear on lower display screen line 20 one line at a time.

Figure 2:
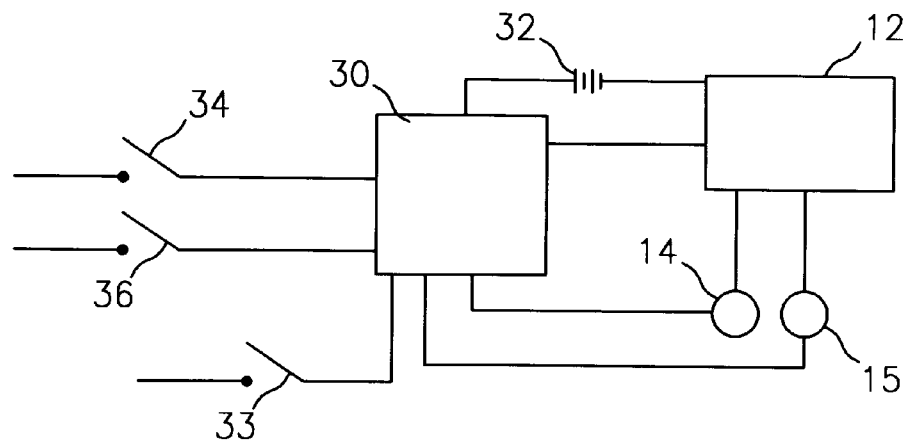
FIG. 2 shows the timer electrical system in simplified block flowsheet form.

The microprocessor or microprocessor controller 30, FIG. 2, is programmed to have a daily calendar and an internal clock. The microprocessor is further programmed to show user input settings of listed menu items line at a time and to allow modifying each of the settings of the listed menu items with the single pole double throw selector switch 14 to select menu item settings and the second single pole double throw change switch 15 to change or modify settings of the menu items when change is desired. The microprocessor using the settings calculates and records time of sunrise and sunset and in a first output time settable system may calculate desired time activation periods in the AM as offsets from sunrise and time activation periods in the PM as offsets from sunset. In a second output time settable system time and duration of desired output activation period may be a fixed clock time. In a third or auxiliary time activation period the duration of the activation period is preselected and the time of activation is user chosen and manually remotely operated.

Menu item default settings may be follows:

| | |
|---|---|
| * blank | display off |
| * Time 12:25:24 A | for hours, minutes and seconds with A for AM and P for PM |
| * Time Zone = CTZ | may be set for local time zone ETZ or MTZ or PTZ or CTZ |
| * Date = 01/12/98 | month/day and year |
| * Day = Wednesday | day of the week (Std/Daylight Saving time conversion on Sat. night only) |
| * Lat. = 30.3 | latitude in degrees to one decimal place |
| * Lon = 97.7 | longitude in degrees to one decimal place |
| * s&s1 06:55A 05 S | first sunrise and sunset offset run, time of, A or P and seconds duration |
| * s&s2 07:15A 03 S | second run |
| * s&s3 07:35A 05 S | third run |
| * s&s4 05:10P 05 S | fourth run |
| * s&s5 05:25P 05 S | fifth run |
| * s&s6 05:40P 05 S | sixth run |
| * clk1 03:20A 03 S | first clock run, Time of, A or P, and seconds duration |
| * clk2 11:30A 02 S | second clock run |
| * clk3 03:00P 03 S | third clock run |
| * clk4 11:00 04 s | fourth clock run |
| * Aux.    03 S | Auxiliary/remote/test run, of three seconds duration |
| Blank | Display off |

A user programs the unit for-his use by changing the default settings using the single pole double throw selector switch 14 and a single pole double throw change switch 15. Both switches are spring loaded to return to an OFF central position. To change the first line in the example default setting menu:

the user pushes the selector switch upward or downward momentarily. This activates the display screen 12. The upper line 18 will display the time of sunrise on the left and the time of sunset on the right as calculated from the default settings. The lower line 20 will display the default time:

Time 12:25:24A and the cursor will appear under the hours number 12. As an example . . . if the user wishes to set the time to the actual time 10:20, AM he toggles the change switch upward ten times and the number 10 appears in the hour place. He then toggles the selector switch upward one time to move the cursor under the 25 and toggles the change switch downward five times to display the desired 20 number. If the user is changing settings using a watch with a second hand just before the second hand gets straight up to enter the next minute he momentarily toggles the change switch upward and that will advance to the next minute and restart the clock at zero seconds to exactly match the watch.

After the setting as outlined the user toggles the selector switch upward to display the next line on the menu with the cursor under the term CTZ. The user then toggles the change switch to change to his time zone.

Each item or setting in the menu can be changed or reprogrammed as outlined. If a user does not wish to use any one of the default setting runs he simply sets that run for zero seconds and the run is effectively eliminated unless or until the user reprograms to use the run.

The timer unit 10 has two screws 17 on the face that may be used to short across to test the timer unit or may be used with dual lead wires and a push button switch to activate the unit for the number of seconds set in the menu under the aux. term. In some embodiments the timer unit is equipped to be remotely operated with a handheld transmitter similar to the well known automatic garage door opener to activate the timer unit for the time set under the aux. menu item. The timer is preprogrammed using the user programmed changed settings to correct for leap year and to automatically change from standard to daylight saving time and vice versa on the appropriate days.

FIG. 2 shows internal circuitry in block flowsheet form in timer case 10, FIG. 1. Microprocessor controller 30 is programmed as discussed under FIG. 1, is powered from battery 32 or other direct current source and is operably connected with display screen 12, and output or outlet switches 34, 36, and 33, and selector switch 14 and change switch 15. Switches 14 and 15 are used to change settings as discussed under FIG. 1. Each of the output switches are governed by associated settings or lines in menu items as discussed under FIG. 1. Output switches 33, 34, and 36 are in lines leading to electrical equipment and when the timer 10 is used with an animal feeder 1, FIG. 3, the switches are in lines leading to electric motor 4 in dispenser unit 3. The switches are selectively closed to operate motor 4, FIG. 3, for time activation periods as discussed under FIG. 1.

Figure 3:
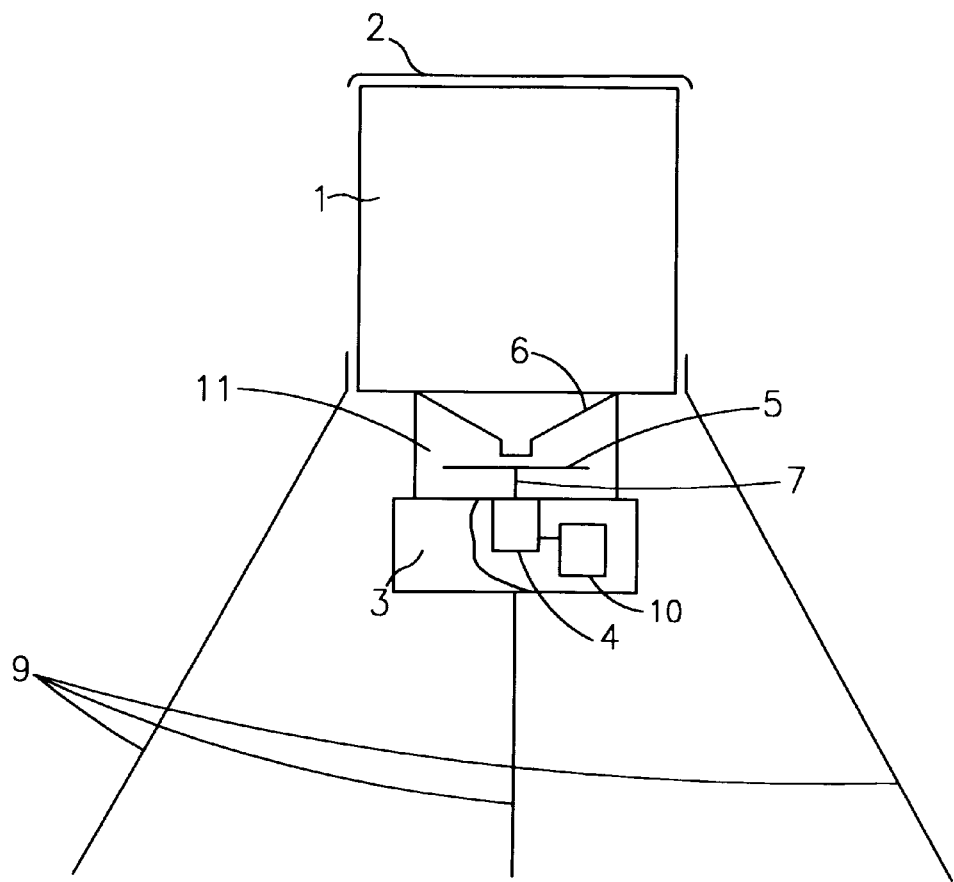
FIG. 3 shows the sun synchronized timer as it may be used with an animal feeder.

FIG. 3 shows an animal feeder with feed container body 1 preferably of galvanized steel with rainproof closure 2, legs 9 and a cone or funnel shaped outlet 6 that discharges close to rotatable spinner plate 5. Clearances are such that feed outflow continues only during the time that rotatable spinner plate 5 is spinning. Spinner plate 5 is preferably vaned or ridged to give more effective feed dispersion. Spinner plate 5 is motor driven by motor 4, located in an interior of dispenser 3. Dispenser unit 3 may be bolted to feeder body 1 with struts 11. Timer 10 is preferably mounted on an inner side of a rainproof hinged door on dispenser 3 and controls operation of the motor 4 to drive the spinner plate 5 at user desired times for user desired intervals as discussed under FIG.'S 1 and 2.

What is claimed is:

1. A sun synchronized timer for an animal feeder comprising:

a) a feed container body, b) a funnel shaped outlet attachable to said container body, c) a rotatable outlet for said feed container body operably attached below said funnel shaped outlet, d) a dispenser body operably connected with said rotatable outlet and said funnel shaped outlet;

e) an electrically driven motor means in said dispenser body; said motor means being activatable to start, stop, and operate said rotatable outlet, f) a timer body contained within said dispenser body, g) a visible display screen in said timer body, h) an electrically driven microprocessor controller in said timer body; said controller being programmed to display menu settings comprising latitude longitude local time zone day of the week time of day date a first output time settable system with settings for setting time of day and duration of time for each rotation period of said rotatable outlet with time of day automatically measured in hours and minutes offset from sunrise and sunset computed by said microprocessor for each day;

i) a menu setting modification means in said timer body comprising a manually operable single pole double throw selector switch means and a manually operable single pole double throw change switch means; said selector switch means being movable upward and downward to activate said display and being movable upward and downward to a move a cursor in one of said menu settings on said display screen and said change switch means being user movable upwards and downwards to change individual entries in said one of said menu settings according to a location of said cursor thereby allowing a user to choose time of activation and duration of period of activation of said electrical output means;

j) a minimum of one output switch operably connected to said microprocessor with said microprocessor operably connecting said minimum of one output switch with a minimum of one of said menu settings and with said minimum of one output switch operably connected with said electrically driven motor means.

2. A sun synchronized timer for an animal feeder as in claim 1 further comprising a second output time settable system for setting time of day and duration of time for each rotation period of said rotatable outlet with time of day settable at fixed clock time.

3. A sun synchronized timer comprising a) a case, b) an electrical power source for an electrical circuit in said case, c) a visible display screen in a face of said case;

d) an electrically powered microprocessor controller and a first and a second electrical output means in said timer body; said controller being programmed to display one line at a time computed sunrise and sunset times and menu item settings comprising latitude
longitude
local time zone
day of the week
time of day
date a first output time settable system with a minimum of one setting for time of day and duration of time for each activation period of said first output means with time of day automatically measured in hours and minutes offset from said sunrise and sunset time for each day;

e) a manually operable single pole double throw selector switch means and a manually operable single pole double throw change switch means in said timer case; said selector switch means being movable upward and downward to activate said display and being movable upward and downward to a move a cursor in one of said menu item settings on said display screen and said change switch means being user movable upwards and downwards to change individual entries in said one of said menu item settings according to a location of said cursor, thereby allowing a user to choose time of day and duration of time for each activation period of said first output means with time of day automatically measured in hours and minutes offset from said sunrise and sunset time for each day.

4. A sun synchronized timer as in claim 3 further comprising a second output time settable system with a minimum of one setting for time of day and duration of time for each activation period of said second outlet means with time of day settable fixed clock times.

5. A sun synchronized timer as in claim 3 wherein said output means may be activated for checking the unit by shorting across terminals without interfering with preset outlet times.

6. A sun synchronized timer as in claim 3 wherein said microprocessor uses user entered data in said menu settings to automatically change to and from daylight saving and standard time and to correct for leap year.

7. A sun synchronized timer comprising a) a case, b) an electrical power source for an electrical circuit in said case, c) a visible display screen in a face of said case;

d) an electrically powered microprocessor controller in said case, said microprocessor having a running clock and a running calendar therein;

e) a minimum of one electrical output means operably connected with said microprocessor in said timer case; said controller being programmed to display computed sunrise and sunset times and to activate said electrical output means using default setting menu items comprising latitude
longitude
local time zone
day of the week
time of day
date a first output time settable system with a minimum of one setting for time of day and duration of time for each activation period of said first output means with time of day automatically measured in hours and minutes offset from said sunrise and sunset time for each day;

f) a default setting menu item modification means in said timer case comprising a manually operable single pole double throw selector switch means and a manually operable single pole double throw change switch means; said selector switch means being movable upward and downward to activate said display and being movable upward and downward to a move a cursor to one of said menu items on said display screen and said change switch means being user movable upwards and downwards to change individual entries in said one of said menu items according to a location of said cursor; said default setting menu modification means thereby allowing a user to choose time of activation and duration of period of activation of said electrical output means.

* * * * *